United States Patent
Ford

(10) Patent No.: US 6,176,076 B1
(45) Date of Patent: Jan. 23, 2001

(54) FUEL SYSTEM FOR A GAS TURBINE ENGINE

(75) Inventor: Peter W Ford, Leamington Spa (GB)

(73) Assignee: Lucas Industries plc (GB)

( * ) Notice: Under 35 U.S.C. 154(b), the term of this patent shall be extended for 0 days.

(21) Appl. No.: 09/215,768

(22) Filed: Dec. 18, 1998

(30) Foreign Application Priority Data

Dec. 24, 1997 (GB) .................................................. 9727157

(51) Int. Cl.$^7$ .................................................. F02C 9/26
(52) U.S. Cl. .................................. 60/39.281; 60/734
(58) Field of Search ....................... 60/32.281, 734

(56) References Cited

U.S. PATENT DOCUMENTS

| | | | |
|---|---|---|---|
| 4,493,187 | * | 1/1985 | Hansen .............................. 60/39.281 |
| 4,817,376 | * | 4/1989 | Brocard et al. ................... 60/39.281 |
| 5,209,058 | * | 5/1993 | Sparks et al. ..................... 60/39.281 |
| 5,490,379 | * | 2/1996 | Wernberg et al. ................ 60/39.281 |

* cited by examiner

Primary Examiner—Louis J. Casaregola
(74) Attorney, Agent, or Firm—Andrus, Sceales, Starke & Sawall

(57) ABSTRACT

A fuel metering system having a fuel pump operable to supply fuel at high pressure to a metering valve from which metered fuel is fed, in use, via a pressure raising valve to a gas turbine engine, a spill valve connected between the high pressure (HP) supply upstream of the metering valve and low pressure (LPp), and a restrictor device connected between the spill valve and low pressure (LPp), the pressure (LPf) arising at or upstream of the restrictor device, which varies according to spill flow through the device from the spill valve, being applied to the pressure raising valve, such that the pressure required to open the pressure raising valve varies in response to the amount of fuel spilled by the spill valve.

8 Claims, 3 Drawing Sheets

FUEL SYSTEM FOR A GAS TURBINE ENGINE

This invention relates to a fuel system for a gas turbine engine, such as a jet engine, primarily for use in aircraft, the system incorporating a pressure raising valve in the metered fuel supply path serving to maintain a minimum level of system pressure, thereby providing sufficient pressure to enable ancillary items of engine control equipment to function correctly.

In a fuel system for an aircraft jet engine, it is common practice to supply pressurised fuel from an engine-driven fixed displacement pump. The system is required to provide a pressure gradient in the fuel flow from the pump to the engine combustor so that flow can be metered to the engine and the engine variable geometry actuators controlled. As a result of the pressure rise generated by the pump and the correct functioning of the pump, metering system and external actuators, there will be a flow of pressurised fuel, known as parasitic flow, back to the pump inlet. The magnitude of this flow is a function of the pressure rise that exists from the inlet to the outlet of the pump. When the difference between the free flow delivered by the pump, which is a function of its size, and the parasitic flow is less than that required to sustain combustion in the engine, the engine cannot be started. It is therefore imperative to minimise the pump pressure rise at engine start-up, especially at low speed re-light conditions, consistent with the correct operation of the aforesaid system components, to provide sufficient fuel flow to the engine to allow the engine to be started at very low speeds. In addition to this, it can be advantageous to shape the characteristic of pump pressure rise at other operating conditions within the flight envelope of an aircraft fitted with the system.

An object of the invention is to provide a fuel system for a gas turbine engine, in which the aforesaid requirements are fulfilled in a simple and convenient manner.

According to the present invention, a fuel metering system comprises a fuel pump operable to supply fuel at high pressure to a metering valve from which metered fuel is fed, in use, via a pressure raising valve to a gas turbine engine, a spill valve connected between the high pressure supply upstream of the metering valve and low pressure, and a restrictor device connected between the spill valve and low pressure, the pressure arising at or upstream of the restrictor device, which varies according to spill flow through the device from the spill valve, being applied to the pressure raising valve, such that the pressure required to open the pressure raising valve varies in response to the amount of fuel spilled by the spill valve.

Preferably, the pressure arising at or upstream of the restrictor device is applied to the pressure raising valve in opposition to the metered fuel pressure.

The use of a restrictor device in the aforesaid manner can produce acceptable results provided that the engine windmill re-light speed is not reduced beyond a pre-determined minimum value. If the re-light speed is reduced further, it is desirable to limit the system pressure rise to relieve the demand on the pump.

This may conveniently be achieved by providing a pressure device operatively associated with the pressure raising valve and movable under pressure to assist opening of the pressure raising valve. Such assisting movement of the pressure device may conveniently be limited so that the effect of the device is nullified after movement through a predetermined distance.

Preferably, the pressure device is a piston of which the movement is preferably limited by engagement with a stop.

The invention will now be described, by way of example, with reference to the accompanying drawings in which.

Figure 1:
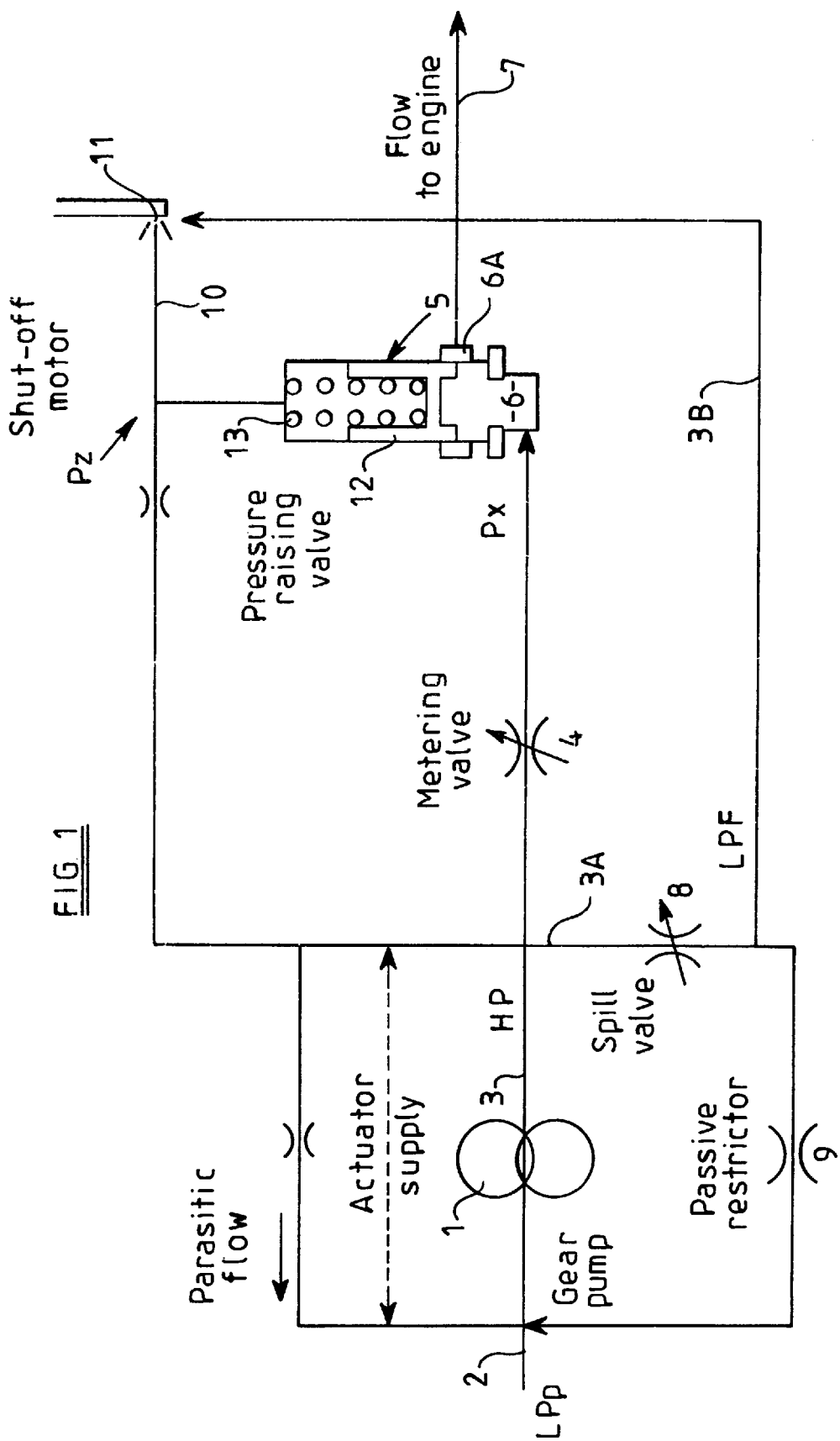
FIG. 1 is a diagrammatic representation of one embodiment of the fuel metering system of the invention.

In the fuel metering system illustrated in FIG. 1, a pump 1 fed with fuel at low pressure LPp from a line 2 produces a high pressure output HP which is supplied via a line 3 to a metering valve 4. The valve 4 provides a supply of metered fuel to a pressure raising valve 5, from a chamber 6 of which fuel is supplied along a line 7 to a gas turbine engine (not shown). A spill valve 8 is connected by a line 3A to the line 3 upstream of the metering valve and also, via a passive restrictor 9, to the line 2 at the low pressure side of the pump. A branch 3B of the line 3A s connected to a line 10 by way of a normally open valve orifice 11 controlled, for example, by a torque motor (not shown) associated with the engine shut-off valve, for the purpose to be described. The pressure raising valve contains a flow control element in the form of a piston 12 urged by a spring 13 towards a closed position in which it precludes flow through an outlet port 6A of the pressure raising valve into the line 7 and thence to the engine.

For a given predetermined re-light engine speed, the system operates in the following manner to produce a minimum system pressure rise, which is high enough to operate auxiliary equipment and low enough to avoid excessive parasitic flow and thus to permit the required flow of fuel to the engine. For the aforesaid re-light engine speed, the flow through the spill valve 8 along line 3A produces a negligible pressure drop across the passive restrictor 9. Consequently the pressure Lpf in line 3B is approximately equal to the low pressure LPp prevailing upstream of the pump 1 and the pressure Pz fed to the upper side of the piston 12 (as seen in the drawing) where it opposes the metered fuel pressure Px, is low, providing very little assistance to the spring 13. This enables the pressure raising valve 5 to be opened with relatively low pressure Px applied via the metering valve 4 to the chamber 6 leading to a pressure drop across the valve 5 which, when added to a pressure drop across the metering valve 4, produces the desired system pressure. This is sufficiently high to operate auxiliary equipment, such as system actuators, but low enough to reduce pump leakage and other parasitic losses to acceptable levels.

As engine speed increases, spill-back from the upstream side of the metering valve 4 increases to a significant level, causing the pressure drop across the passive restrictor to increase correspondingly. This results in an increase in the pressure Lpf and consequently of Pz which assists the spring 13 in opposing the opening of the pressure raising valve 5, resulting in an increase in system pressure. By judicious choice of the size of the passive restrictor and the force of the spring 13, the system can be made to provide an adequate, but not excessive system pressure rise at all operating conditions. The pressure levels provided by this arrangement are adequate for actuation of auxiliary equipment without adversely affecting heat rejection into the fuel.

When the attained engine re-light speed is very low, it s necessary to introduce an addition measure to ensure that the system pressure at low speed is kept at an acceptably low level. One form of such an additional measure is illustrated in the modified system of FIG. 2 in which the same numerals as those in FIG. 1 are used for the same parts.

The general arrangement of the modified system is the same at that described above, but is modified by the addition of a further cylinder 20 containing a slidable piston 21 having a rod 22 extending from one side thereof towards and in axial alignment with a rod 23 projecting from an end of the piston 12, the rods being in mutual engagement in the balanced condition illustrated in the drawing. A stop 24 on the internal wall of the cylinder below the piston 21 limits movement of this piston in the direction towards the piston 12, the latter being normally pushed by the spring 13 to a position in which the piston 21 is spaced from the stop, as illustrated.

High pressure fuel from the pump 1 is fed to a chamber 20A at one side of the piston and creates a force on the piston 21 acting via the rods 22, 23 on the piston 12, in opposition to the force of the spring 13. This opposes the force of the spring and hence the pressure required in the chamber 6 to open the valve orifice 6A, thereby achieving a lower start system pressure than would be possible with the arrangement of FIG. 1. As engine speed increases to idle, spill flow increases, causing an increased pressure drop across passive restrictor 9, thereby increasing the pressure rise to a value just sufficient to operate auxiliary equipment, as already explained in relation to FIG. 1. The pressure rise is further increased at cruise due to increased engine speed, resulting in higher spill flow and higher resulting pressure drop across restrictor 9. As engine fuel flow increases further, the piston 21 continues to move until it contacts the stop 24, nullifying the effect of the pressure in the chamber 20A so that it no longer assists opening of piston 12. The piston 12 is still subject to the pressure Px in the chamber 6 acting against the force of the spring 13 biasing the piston 12, which pressure increases as a result of increasing spill to the passive restrictor 9, as previously. This permits the establishment of yet further increased system pressure as a result of pump speed and the consequential increase in spill flow that is suitable for climb conditions. This further increase in pressure at climb is required for auxiliary equipment in some applications. If stop 24 were not included, the pressure rise at climb would tend to decrease relative to cruise due to the increased engine flow needed (i.e. reduced spill).

Figure 2:
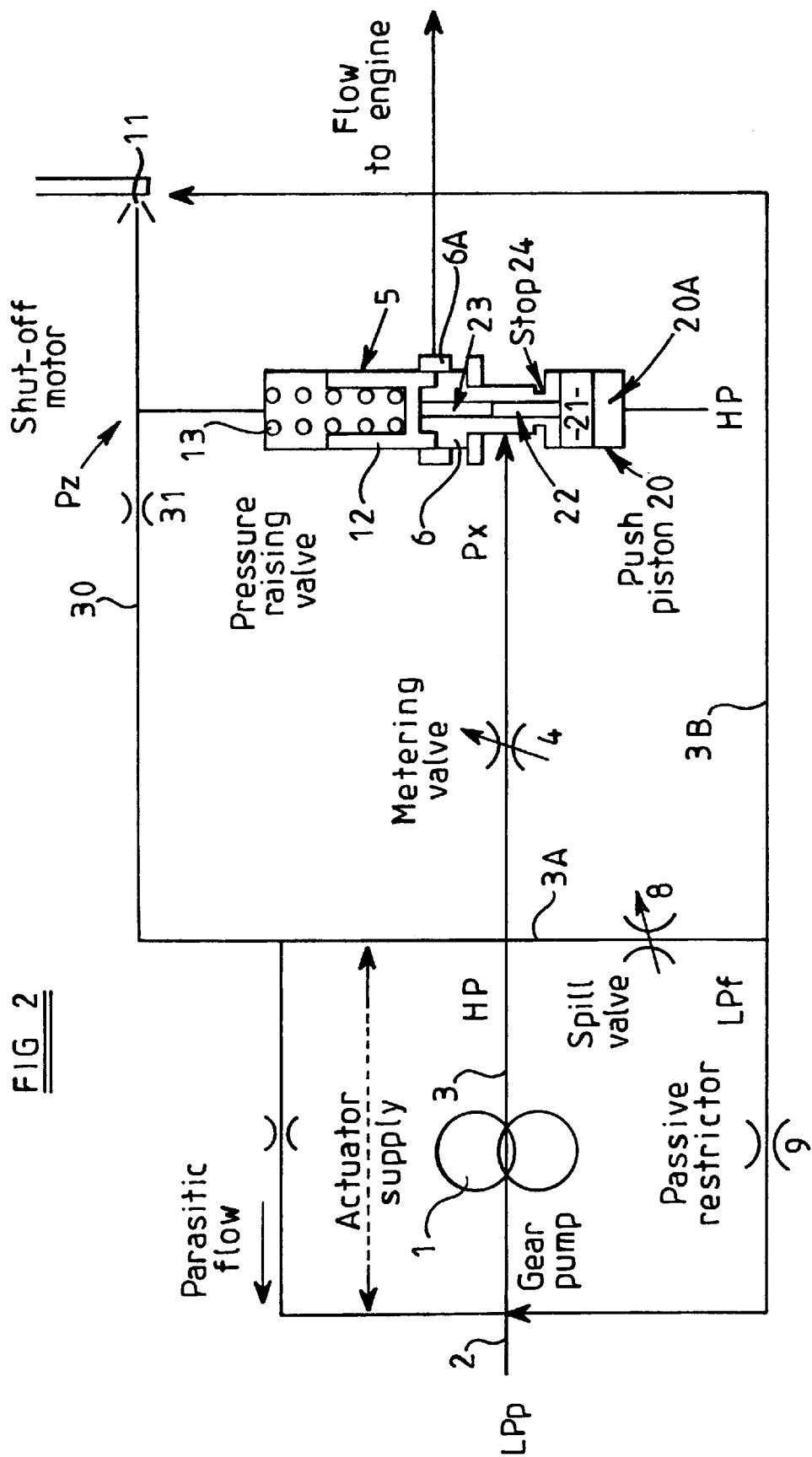
FIG. 2 is a view similar to FIG. 1 of a modified form of the system of the invention.
Figure 3:
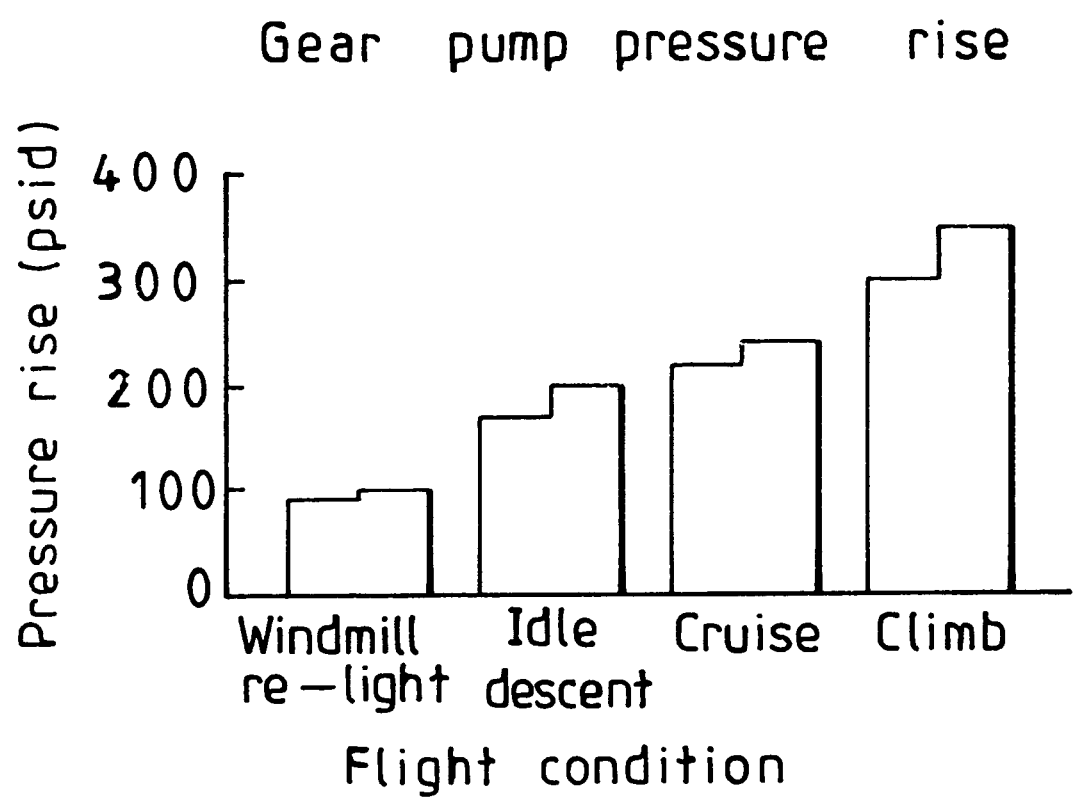
FIG. 3 is a graph of system pressure rise plotted against typical engine flight conditions.

The bar chart in FIG. 3 plots the system pressure rise against engine flight conditions and clearly illustrates the respective effects of the pressure drop at the passive restrictor 9 and the additional piston which are used, in combination, in the FIG. 2 arrangement. It will be seen that the pump pressure rise is about 100 psi during windmill re-light conditions for which there is a negligible pressure drop across the passive restrictor. The increased spill back from the spill valve at higher engine speeds increases the pressure drop at the passive restrictor, and consequently system pressure. This results in a gear pump pressure rise up to 200 psi at engine idle-descent conditions. A further increase to about 230 psi takes place for cruise conditions due to increased spill flow at higher engine speeds. At some climb conditions, more than 230 psi is required for actuation purposes. This is achieved, as explained previously, by the piston 21 contacting stop 24 so that piston 21 no longer assists opening of PRV 12, and pump pressure rise increases to more than 280 psi.

The embodiment of FIG. 2 thus provides a fuel system with multi-level minimum pressure setting, the minimum pressure varying according to flight conditions.

The purpose of the valve orifice 11 is to provide for shut-down of the engine when required. The valve is open, as illustrated, during normal operating conditions to permit the application of pressure Pz to piston 12, as described. When the engine is to be shut down, the valve 11 is closed and high pressure is applied via the line 30 and restrictor 31 to the piston 12, causing rapid closure of the valve and resultant engine shut-down.

What is claimed is:

1. A fuel metering system comprising a fuel pump operable to supply fuel at high pressure to a metering valve from which metered fuel is fed, in use, via a pressure raising valve to a gas turbine engine, a spill valve connected between the high pressure supply upstream of the metering valve and low pressure, and a restrictor device connected between the spill valve and low pressure, the pressure arising at or upstream of the restrictor device, which varies according to spill flow through the device from the spill valve, being applied to the pressure raising valve, such that the pressure required to open the pressure raising valve varies in response to the amount of fuel spilled by the spill valve.

2. A system as claimed in claim 1, wherein the pressure arising at or upstream of the restrictor device is applied to the pressure raising valve in opposition to the metered fuel pressure.

3. A fuel metering system as claimed in claim 2, wherein the pressure raising valve includes a pressure responsive element urged by a mechanical device in a direction such as to assist said pressure arising at or upstream of the restrictor device.

4. A fuel metering system as claimed in claim 3, further including a pressure device mechanically connected to the element of the pressure raising valve and moveable under pressure to move the element against the device and said pressure arising at or upstream of the restrictor device.

5. A system as claimed in claim 1, further including a pressure device operatively associated with the pressure raising valve and movable under pressure to assist opening of the pressure raising valve.

6. A system as claimed in claim 5, wherein such assisting movement of the pressure device is limited so that the effect of the device is nullified after movement through a predetermined distance.

7. A system as claimed in claim 5, wherein the pressure device is a piston.

8. A system as claimed in claim 7, wherein the movement of the piston is limited by engagement with a stop.

* * * * *